United States Patent Office 3,546,936
Patented Dec. 15, 1970

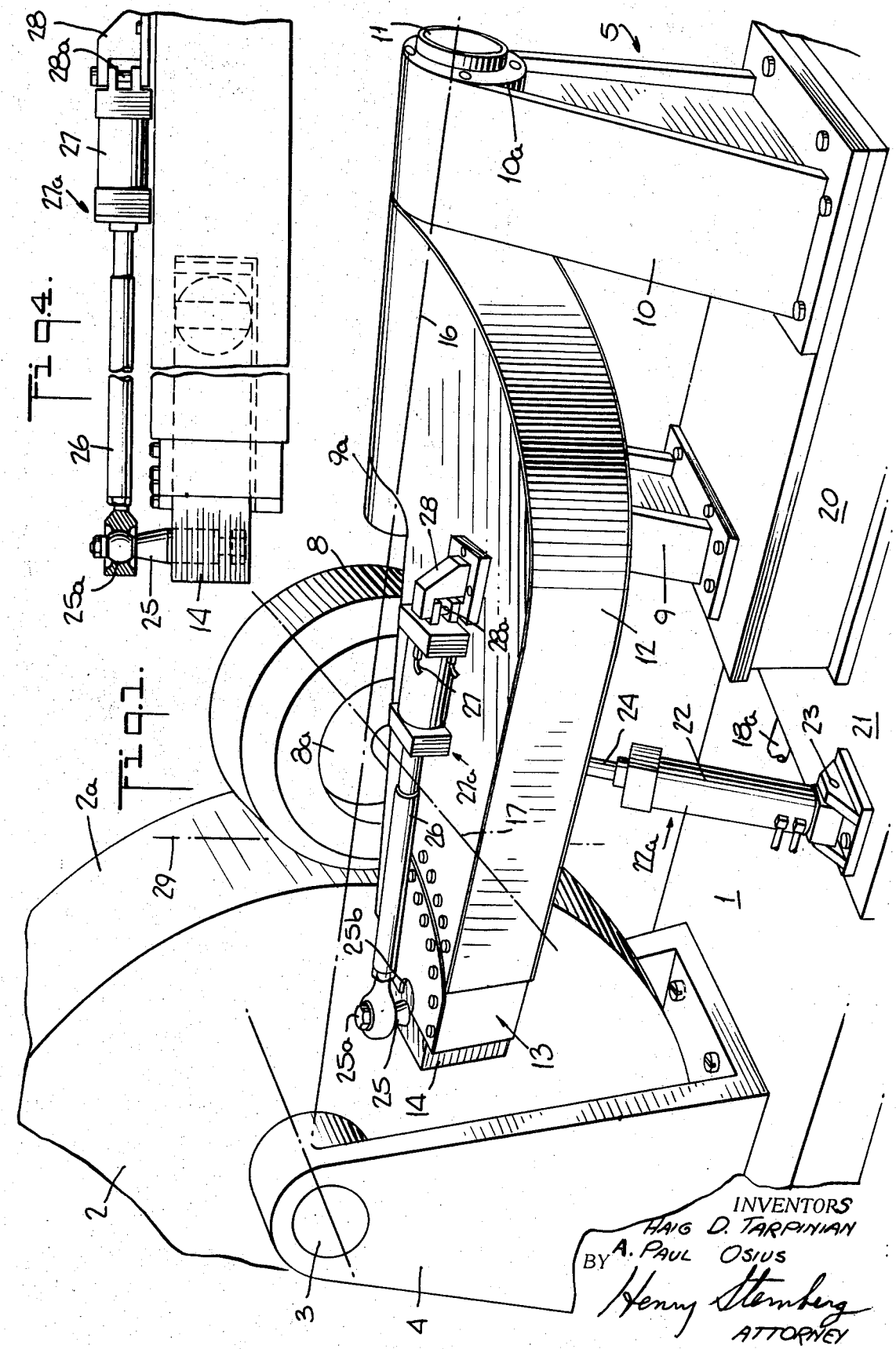

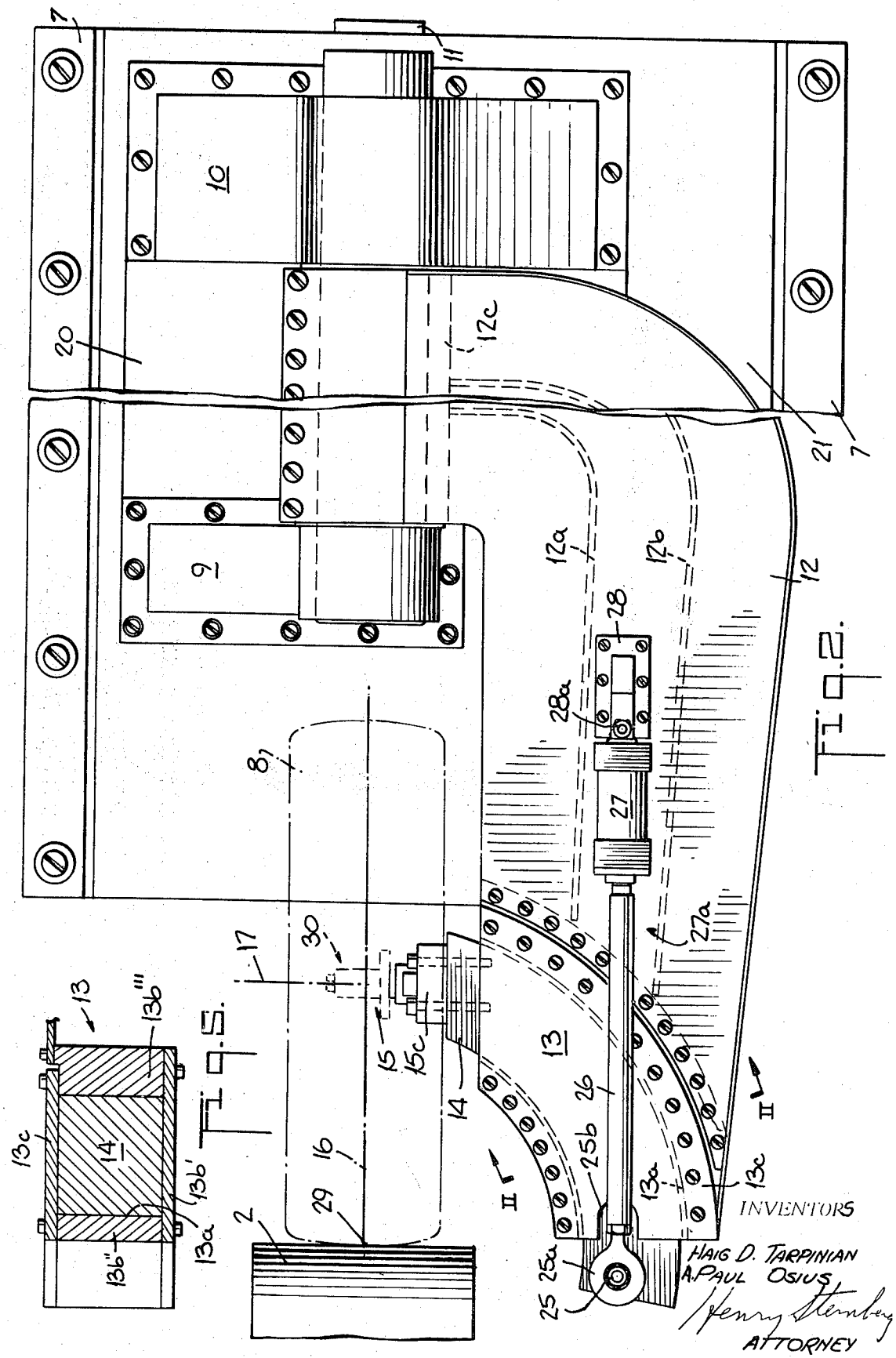

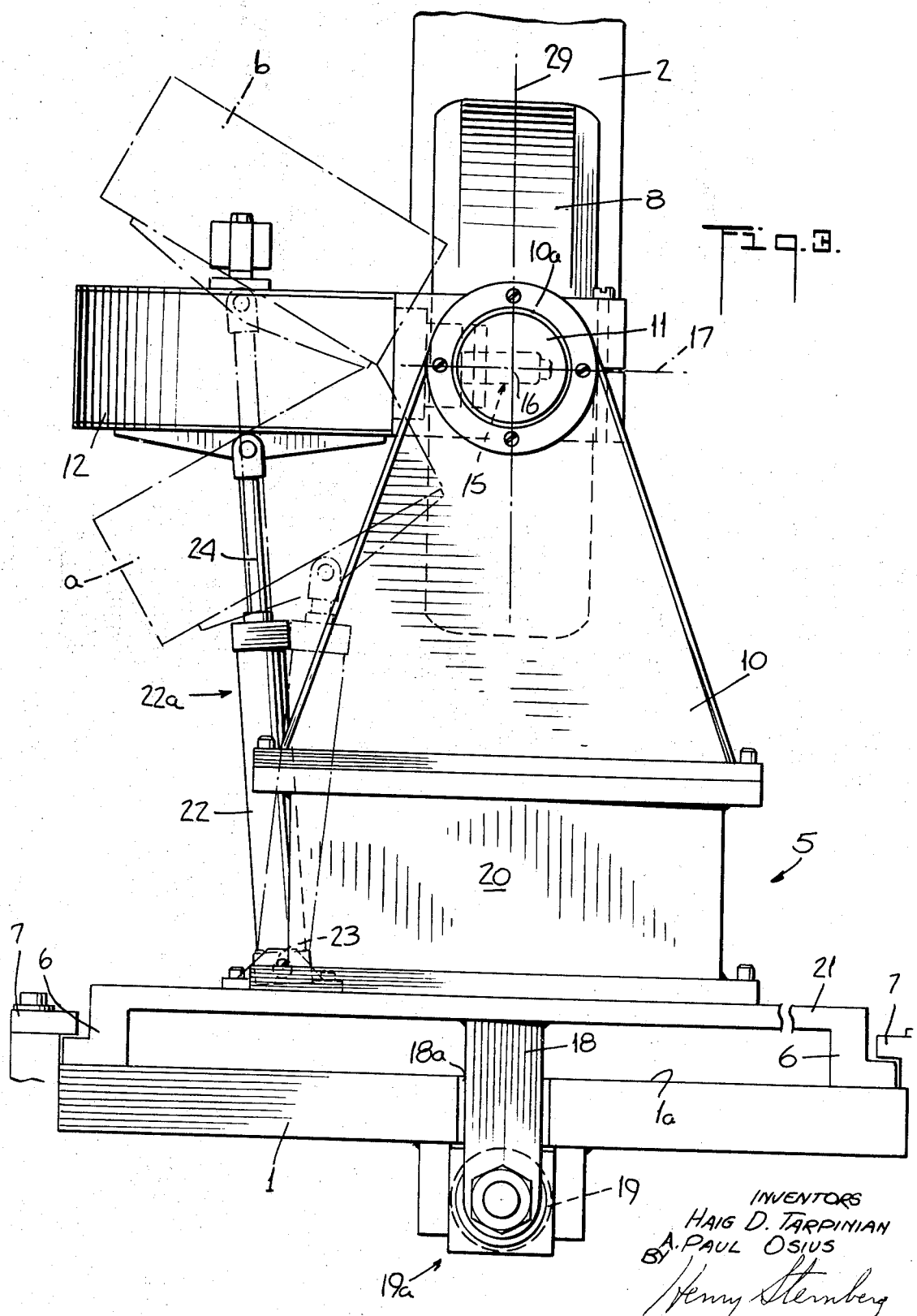

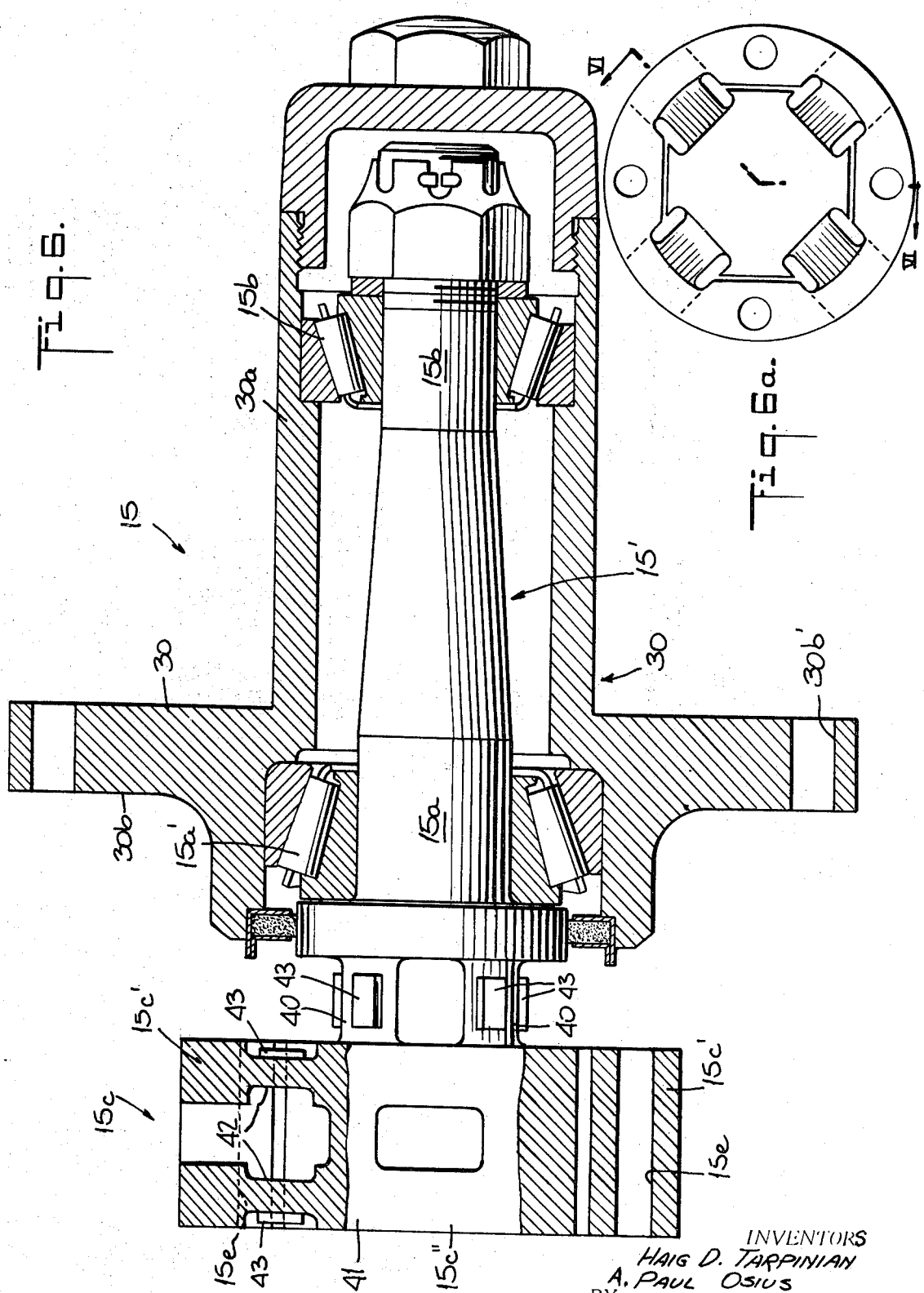

---

3,546,936
TIRE TESTING APPARATUS
Haig D. Tarpinian, Grosse Pointe Park, and Adolph Paul Osius, Detroit, Mich., assignors to Uniroyal, Inc., New York, N.Y., a corporation of New Jersey
Filed June 12, 1968, Ser. No. 736,448
Int. Cl. G01m 17/02
U.S. Cl. 73—146                    20 Claims

ABSTRACT OF THE DISCLOSURE

An apparatus for dynamically testing tires under various yaw and camber conditions. A tire mounting device positioned at the end of a cantilevered arm supports the tire for rotation about its own axis. The cantilevered arm is swivable about a second axis which intersects the tire axis for yaw movement of the mounting device and the tire thereon. Camber movements are achieved by constructing the tire mounting device relatively arcuately movable with respect to its cantilever arm support.

---

This invention relates to apparatus of the type adapted to test tires and the like, and wherein a tire mounted on a wheel is adapted to be moved into and out of contact with a rotating flywheel in varying positions of yaw and camber with respect to such flywheel.

Apparatus of the general character described has been provided heretofore. However, the existing equipment has been found to be unnecessarily complex in that it required either additional mechanical computations, or additional electronic circuitry for performing such computations, in order to convert the test results into usable data. The existing equipment has not adapted itself to programming true camber into the tire being tested, nor to the accurate measurement of forces on the tire so programmed. The aforementioned additional mathematical calculations and/or circuitry required on existing equipment for performing such calculations, introduce additional possibilities of error into the results.

It is the principal object of the present invention to avoid and overcome the foregoing and other difficulties of and objections to the known test equipment by the provision of a simplified accurate apparatus for testing tires, wherein mathematical calculations required, or circuitry provided therefor, are kept to a minimum by the provision of a simplified yaw and camber adjustment arrangement together with means for accurately measuring the forces on the rotating tire in different positions of adjustment thereof.

Another object of the invention is the provision of apparatus such as described, wherein the camber positioning means provides a true indication of the camber angle position of the tire.

It is a further object of the present invention to provide an apparatus of the character described wherein the arcuate movement of the tire, in both yaw and camber directions, corresponds directly to the inputs to the apparatus, without requiring intermediate mathematical calculations and/or electronic circuitry or similar means for performing such calculations.

It is a still further object of the present invention to provide a compact and sturdy apparatus of the type described.

The foregoing objects of the invention, and other objects which will become apparent as the description proceeds, are achieved, according to one embodiment of the invention, by the provision of apparatus for testing tires and the like including a flywheel journalled on a horizontal axis, means for rotating the flywheel, a horizontal base positioned beneath a horizontal radius of the flywheel and extending horizontally beyond the periphery of the flywheel, a reciprocable carriage mounted on the base for movement toward and away from the flywheel, means for adjustably moving the carriage on the base, a shaft supported on the carriage in alignment with the horizontal radius of the flywheel, a cantilevered half-fork member pivotally carried by the shaft and extending substantially parallel to the axis of the shaft, and said half-fork member carrying a relatively movable portion located near the free end of the half-fork member, said movable portion, in turn, carrying a stub axle the axis of which intersects the axis of said shaft. Actuating means interconnect the half-fork member and the movable member carried thereby for effecting arcuate movement of the latter in a manner to vary the angle between the stub axle axis and the shaft axis. Load cell means associated with the stub axle measure lateral forces thereon and also measure forces thereon at an angle to said lateral forces. The apparatus, according to the present invention, can be used to measure radial forces, lateral forces and tractive forces. It can also measure steering moment, i.e., self aligning torque, and camber moment, over a wide range of steer and camber angles.

Tire testing apparatus of this general category is illustrated and described in U.S. Pat. 3,060,734, issued on Oct. 30, 1962 to R. W. Obarski et al. In the tire testing apparatus of the prior art the relationship between the stub axle, which rotatably supports a tire, and the cantilever member which supports the stub axle, is fixed. Thus, in the known apparatus, cambering is accomplished by pivoting the entire carriage and table assembly about a vertical axis tangent to the periphery of the flywheel. The prior art apparatus, therefore, suffers from the grave disadvantage that for any yaw position of the tire, other than the purely vertical, the pivotal movement required for obtaining a desired camber angle does not correspond to the true camber angle of the tire with respect to the flywheel but rather corresponds to some other angle which varies as a function of the yaw angle.

The apparatus according to the present invention overcomes the aforesaid disadvantages by providing a camber angle adjustment which is entirely independent of the yaw angle position of the tire so that, without having to resort to mathematical computations, the tire may be directly set to any desired camber angle irrespective of the yaw angle position of the tire at such time.

FIG. 1 is a perspective view of the apparatus according to one embodiment of the present invention;
FIG. 2 is a top plan view of the tire testing apparatus according to the present invention;
FIG. 3 is an end elevational view of the apparatus illustrated in FIG. 2;
FIG. 4 is a front elevational view of a portion of the structure illustrated in FIG. 2;
FIG. 5 is a sectional view taken in the direction of arrows II—II of FIG. 2;
FIG. 6 is an enlarged sectional view of the wheel and tire supporting spindle of FIG. 2 taken in the direction of arrows VI—VI of FIG. 6a; and
FIG. 6a is a side elevational view of the spindle shown in FIG. 6.

Referring now to the drawings and first to FIG. 1, there is illustrated an embodiment of the present invention in which an elongated rigid base 1 is suitably fixed to the ground. A large flywheel or road-wheel 2 having a peripheral surface 2a, which simulates the surface of a road, has an axle 3 which is suitably journalled in a U-shaped support 4 rigidly connected to the base 1.

Mounted on the base or table 1 is a carriage 5 which is adjustable toward and away from the flywheel 2. Suitable spline or V-guide mountings between the table and the carriage can be provided for this purpose, but in the embodiment of the invention illustrated (FIG. 3), the carriage 5 is formed with horizontally extending parallel leg portions 6 which extend into and are guided by parallel guide rails 7 fixed to and extending upwardly from the base 1. Mounted on the carriage 5 is the mechanism for rotatably supporting a tire 8. This mechanism takes the form of a pair of hollow-box formed bearing supports 9 and 10 having, respectively, bearings 9a and 10a journalling a shaft 11 for rotational movement. Secured to the shaft 11, intermediate the bearings, 9a and 10a, is the short end of an L-shaped one-half fork member 12 constituting a support means at the free end of which is carried a guide member 13 defining an arcuate open-ended chamber 13a in which there is slidingly received a tire mounting means in the form of an arcuately shaped segment 14 (FIG. 2). Segment 14, in turn, carries at one end thereof a stub axle 15 upon which the tire 8 on wheel 8a is rotatably mounted as described in more detail below.

According to the present invention the axis 16 of shaft 11 is coincident with the horizontal radius of flywheel 2, while the axis 17 of the stub axle 15 extends transversely to and intersects the axis 16. As used herein and in the claims appended hereto, the term "intersecting" with respect to lines and axes, is intended to include lines or axes which even though not physically touching, cross in space in close proximity to one another.

By making the member 12 in the shape of one-half of a fork and utilizing a cantilevered stub-type axle 15, one entire side of the tire 8 and associated wheel member and stub axle is left exposed, so that mounting and demounting of the tire and wheel is greatly simplified.

The movement of the carriage, and thus of the tire 8 carried thereby, toward and away from the flywheel 2 may be achieved by connecting an arm 18, fixed to and extending downwardly from the carriage 5 through a slot 18a in base 1, to a conventional fluid pressure motor as, e.g., a hydraulic actuator 19a having a hydraulic cylinder 19 suitably secured to the base 1. It should be understood that controlling the pressure to the actuator 19 controls the deflection of the tire 8 on the flywheel 2 thereby providing a controlled and/or variable force or loading.

Yaw adjustment of the tire 8 in relation to the flywheel 2 is accomplished by tilting movement of the fork member 12 about the axis 16 of shaft 11.

The bearing supports 9 and 10 are fixedly carried by a rectangular boxed-shaped spacer portion 20 which, in turn, is rigidly secured to the top of base plate 21 of carriage 5 (FIG. 3).

A yaw-actuator means interconnects said support means 12 and the tire mounting means 14, 15 thereon for pivoting the latter about the axis 16. The interconnecting means may be in the form of a hydraulic actuator 22a having a cylinder 22 pivotally connected by a suitable pivot pin 23 to the top of the carriage base plate 21. The free end of piston rod 24 of actuator 22a is suitably pivotally connected to the longer leg of the L-shaped half-fork member 12 for imparting rotational movement to the latter about the axis 16. As seen in FIG. 3 the half-fork member 12 is pivotable, in response to actuation of actuator 22a, between the end positions a and b, shown in dot-dash lines.

The half-fork cantilever member 12 is preferably also made in hollow-box form (FIG. 2) and preferably includes, at the interior thereof, a pair of vertical reinforcing plates 12a and 12b and a suitably rigidly connected block 12c fixed to shaft 11. The arcuately shaped camber guide means 13 (FIG. 5) is preferably constructed of a base plate 13b', a pair of parallel, curved, side plates 13b" and 13b"' and a generally flat, arcuately extending, cover plate 13c fixed to the side plates 13b" and 13b"' by any suitable means such as the arcuate rows of bolts shown in FIG. 2. A third arcuate row of bolts provides the fixed connection between the guide means 13 and the free end of the cantilever member 12.

The inwardly facing surfaces of the plates 13b', 13b", 13b"' and 13c define an open-ended, arcuately extending, passage 13a in which there is slidingly received the correspondingly shaped segment 14 (FIG. 2). The length of the segment 14 exceeds the length of passage 13a so as to extend outwardly therefrom at both ends when received therein. The tire supporting spindle 15 is carried by segment 14 at one end thereof, with the axis 17 of the spindle intersection the axis 16 of shaft 11.

A camber actuating means 27a is provided in the form of pivot pin 25 (FIG. 4) located at the opposite end of the arcuate segment 14 and fixed thereto by suitable means, and pivotally connected, via a suitable ball joint 25a, to a piston rod 26 of a hydraulic actuating cylinder 27. The actuating cylinder 27 is pivotally connected to the one-half fork member 12 for generally horizontal pivotal movements with respect thereto. The latter pivotal mounting may comprise a bracket 28 suitably connected to the member 12 and having fixed thereto a pivot pin 28a to which the cylinder 27 is pivotally connected. A cut-out 25b is preferably provided in the top plate 13c for permitting a greater amount of relative movement of the segment 14 within the guide means 13 by providing a clearance space for the pin 25. The preferred amount of relative angular movement between segment 14 and member 13 is generally of the order of fifteen degrees, thus providing a possible camber angle variation of the tire of the same order of magnitude.

In operation, a tire 8 mounted on a wheel 8a may be readily bolted onto stub axle 15, from the accessible side thereof. After the wheel 8a is securely bolted to the axle 15, the actuator means 19 is energized for moving the carriage 5 toward the flywheel 2 until the tread of the tire 8 contacts the road surface 2a of the flywheel. Any desired loading of the tire with respect to the flywheel 2 may be accomplished by further lateral movement of the carriage 5 with respect to the flywheel. The amount of such loading may be conveniently determined by conventional means either by position responsive devices which indicate the position of carriage 5 with respect to flywheel 2 (not shown) or by suitable signals produced by force sensitive devices 43 which cooperate with stub axle 15 in a known manner as more fully described below. When the proper amount of loading between tire 8 and the road wheel surface 2a is achieved, the carriage 5 may be locked in position by suitably controlling the valves (not shown) controlling the pressure fluid flow to activator 19a or by any other suitable conventional means (not shown).

The road wheel 2 is of conventional design and is driven, in well known manner, by a drive motor (not shown).

It will be evident that actuation of the actuator means 22a, i.e., by actuating the hydraulic cylinder 22 through suitable conduits connecting the latter to a source of pressure fluid (not shown) will provide a desired yaw, i.e., steer angle, by swivelling the member 12 about axis 16 of shaft 11.

For any given yaw position of the tire 8, the desired camber is achieved by arcuate movement of segment 14 within the guide means 13. The center of curvature of guide means 13 is chosen such that the foregoing movement of segment 14 takes place about an axis of rotation 29 located substantially in a vertical plane tangent to the surface 2a of the flywheel 2 on the side thereof facing the carriage 5. The axis 29 about which segment 14 pivots will, of course, shift angularly together with the member 12 when the latter swivels about axis 16. It will be recognized that depending on the particular dimensions of the tire being tested and the amount of load placed thereon, the axis 29, while remaining substantially parallel to said tangent plane, may under some conditions be slightly spaced therefrom. It is preferred, however, that the apparatus be so dimensioned that for average conditions, i.e., average dimensions of tires to be tested and average tire loading to be used, the axis 29 will lie in the aforesaid vertical plane tangent to the surface 2a.

It will be noted that in the preferred embodiment the axis 16 about which the tire is pivoted to provide steer angle intersects the axis 17 of the tire. It also will be understood, that, as noted above, small dimensional variations are permissible and are intended to come within the scope of this invention. Thus, embodiments in which the axes 16 and 17 are close but do not actually interesect are intended to come within the scope hereof.

Movement of the pivot pin 25 toward and away from the hydraulic cylinder 27, by actuating the latter through suitable conduits connected to a source of pressure fluid (not shown) will result in movement of segment 14 within guide means 13, thus changing the angle of camber of tire 8 with respect to the surface 2a of the road wheel 2. The camber angle setting of the tire 8 with respect to the vertical plane tangent to the road wheel surface 2a is, therefore, in accordance with the present invention, independent of the steer, i.e., yaw angle position of the tire.

In other words, for any particular steer angle, the axes 16 and 17 generally define a plane in space and it is in this plane that the axis 17 shifts during camber angle adjustment. A true camber angle is therefore always obtained irrespective of the yaw position.

The electrical and hydraulic circuitry to accomplish the above described movements is not shown or described herein in detail since it is believed to be well within the knowledge of persons skilled in the art and capable of accomplishment by conventional means.

In accordance with the present invention the amount of extension of the piston rod 26 of the hydraulic actuator means 27a, will provide a direct indication of the camber position, without further computation and without making any adjustment or allowance for steer angle position.

In the preferred embodiment, therefore, the carriage 5 has associated therewith manually operable hydraulic actuators or positioners 19a, 22a and 27a. As previously noted, these positioners are used to set the deflection (load), steer angle, and camber angle, respectively. A stub axle 15 comprising force measuring means described below (FIG. 6), or cooperating with a load cell such as shown in U.S. Pat. 3,060,734, senses the forces and moments produced by the tire 8 mounted thereon. Electronic instrumentation (not shown) of conventional design, converts the signals into meter readings, dial readings and chart recordings, as desired.

The force measuring means according to the present invention preferably comprises an instrumented spindle 15' (FIG. 6) having a suitable number of strain gauges 43 associated therewith and connected in a corresponding number of conventional bridge circuits (not shown). Each of these bridge circuits may be independently balanced, i.e., "nulled out" in the conventional manner using a galvanometer. The signal at the galvanometer is indicative of the variation in force on the particular strain gauge bridge circuit. The spindle may be calibrated by the use of dead weights applied thereto at different angular positions thereof. The spindle 15' which will be described in greater detail below, includes a pair of cylindrical bearing portions 15a and 15b spaced along the axis thereof and adapted to support a pair of coaxial, oppositely directed, thrust bearings 15a' and 15b' respectively. These thrust bearings, in turn, support a hub member 30 for free rotation about said spindle. Hub 30 includes an elongated cup-shaped portion 30a adapted to be received in the central opening of a tire supporting wheel 8a, and a flange portion 30b having circumferentially spaced openings 30b' to which the tire supporting wheel may be bolted much in the same manner that a wheel is bolted to the axle of an automobile. The bearings 15a' and 15b' may be fixed in position on the spindle by conventional means.

Spindle 15' also includes an enlarged cylindrical base portion 15c at one end thereof which is provided with suitable axial openings for bolting the spindle to the arcuate segment 14 (FIG. 2).

The base 15c includes an outer ring portion 15c' surrounding an inner portion 15c" which latter is connected to the outer ring by relatively weakened members, preferably by four sets of radially extending webs 42. These webs 42 form the only connection between the inner and outer portions. Similarly, four axially extending web portions 40 connect the elongated portion of the spindle 15' with said inner base portion 15c" (FIGS. 6 and 6a).

As is known in the art one or more strain gauges 43 may be connected to one or more side faces of each of the web portions 40, 42. A total of between sixteen and thirty-two strain gauges distributed on different surfaces of said web portions has been found suitable for testing the dynamic characteristics of tires in accordance with the present invention.

The strain gauges may be connected with epoxy, or by other conventional means, to the surfaces of the web portions so as to provide information with regard to loading of the spindle column 15" during the test of a tire mounted thereon.

In addition, the deflection of the tire may be measured, for example, with a linear potentiometer (not shown) attached to the base of the moving carriage 5. A manually operated potentiometer may be used to "zero" a deflection meter, in circuit with the linear potentiometer, when the tire barely makes contact with the surface 2a. The meter may be calibrated to read directly in inches.

To measure the steer angle an electrolytic transducer of conventional design may be used (not shown). Such a transducer may be cemented or otherwise suitably connected to the arm 12 and electrically connected so as to form two legs of a bridge circuit. When the steer angle is zero the transducer is level and the bridge is balanced. When arm 12 pivots, the bridge becomes unbalanced and the offset may be read on a meter which may be calibrated in degrees of steer angle.

The camber angle circuit may include a linear potentiometer (not shown) as the transducer. The camber angle potentiometer may be mechanically connected, for example, intermediate the hydraulic cylinder 27 and the associated piston rod 26, to sense the relative motion therebetween. The camber angle potentiometer may be connected in circuit, in well known manner with a meter which may be calibrated directly in degrees of camber angle. The latter meter will indicate the true camber position of the tire irrespective of steer angle position.

A DC tachometer (not shown) may be attached to the drive motor of the flywheel 2 for producing a signal which may be conveniently applied to a meter. The meter may be calibrated directly in miles per hour, i.e., the tangential velocity of a point on the surface 2a of the test wheel 2.

While there has been described above a presently preferred embodiment of the invention, it will be understood that various modifications may be made therein without departing from the spirit of the invention.

Having thus described the invention, what is claimed and desired to be protected by Letters Patent is:

1. In an apparatus including a flywheel for testing tires in rolling contact with the flywheel, in combination:
   tire mounting means adapted to support a tire for rotation about its own axis;
   support means supporting said tire mounting means for oscillation about a second axis which intersects the first mentioned axis at a location within the generally cylindrical space defined by the outer circumferential surface of the tire;
   and means interconnecting said tire mounting means and said support means for varying the angle subtended by said first and second axes.

2. The apparatus according to claim 1 wherein said support means comprises a cantilever member, and means carrying said cantilever member for arcuate movement about said second axis.

3. The apparatus according to claim 2 wherein said tire mounting means includes stub axle means for rotatably supporting a wheel and tire, said cantilever member being half-fork shaped and supporting said tire mounting means in a manner to leave one side of the wheel and tire completely exposed.

4. The apparatus according to claim 1 further comprising a base and a carriage means reciprocably movable on said base in directions parallel to said second axis, said carriage means carrying said support means, said tire mounting means and said interconnecting means for reciprocally moving, in said direction, a tire mounted on said tire mounting mean.

5. The apparatus according to claim 1, wherein said interconnecting means comprises an arcuate guide portion fixed to said support means and a relatively movable portion guided by said guide portion for arcuate movement with respect thereto, said movable portion carrying said tire mounting means.

6. The apparatus according to claim 1 wherein said support means comprises a pivotally supported cantilevered member carrying said interconnecting means in the region of its unsupported end, said interconnecting means including a member which is relatively arcuately movable with respect to said pivotally supported cantilevered member, and said relatively movable member carrying said tire mounting means for movement therewith.

7. The apparatus according to claim 6 wherein said relatively movable member is arcuately shaped, said interconnecting means comprising arcuate guide means rigid with said supporting member for slidably guiding said movable member along an arcuate path.

8. The apparatus according to claim 1 further comprising, first actuating means cooperating with said support means for oscillating the latter about said second axis, and second actuating means associated with said interconnecting means for varying said angle between said first and second axes.

9. The apparatus according to claim 8 further comprising third actuating means cooperating with said support means for reciprocating the latter in directions parallel to said second axis.

10. The apparatus according to claim 1 further comprising force measuring means associated with said tire mounting means for measuring forces transmitted to said tire mounting means by a tire mounted thereon.

11. In an apparatus for testing tires, in combination: a flywheel; means for rotating the flywheel; a stub axle for rotatably supporting a wheel and tire in rolling contact with said flywheel; a cantilever half-fork support for the axle leaving one side of the wheel and tire completely exposed; a shaft carrying the half-fork support for arcuate movement of the latter; and means on said half-fork support for effecting relative angular movement of said stub axle with respect to said half-fork support.

12. In an apparatus for supporting and positioning tires, in combination:
first means for supporting a tire for rotation about its own axis;
second means carrying said first means and supporting the latter for angular movement of said axis in a given plane containing said axis; and
cantilever support means supporting said second means for pivotal movement of said second means together with said first means about an axis transverse to said first mentioned axis and located in said plane.

13. The apparatus according to claim 12 wherein said first means comprises a stub axle for rotatably supporting a wheel and tire; said second means comprises an arcuately movable member supporting said stub axle; and said cantilever support means comprises a half-fork member, a shaft carrying said half-fork member and means supporting said shaft for arcuate movement of said half-fork member.

14. The apparatus according to claim 13 further comprising means interconnecting said half-fork member and said arcuately movable member for effecting arcuate movement of said stub axle in said given plane.

15. The apparatus according to claim 14 wherein said interconnecting means comprises an actuating means operating between said half-fork member and said movable member, and arcuate guide means on said half-fork member for guiding said movable member for arcuate movement in response to actuation of said actuator means.

16. The apparatus according to claim 15 further comprising second actuator means cooperating with said half-fork member for pivotally moving the latter about the axis of said shaft.

17. In an apparatus including a flywheel for testing tires in rolling contact with said flywheel, in combination:
tire mounting means adapted to support a tire for rotation about its own axis;
support means supporting said tire mounting means for oscillation about a second axis and said axes intersecting within the confines of the generally cylindrical space defined by the tread of the tire positioned on said mounting means and said axes together defining a plane which oscillates about said second axis together with said first mentioned axis; and
means interconnecting said tire mounting means and said support means for angularly shifting said first with respect to said second axis in said plane irrespective of the angular position of oscillation of said plane about said second axis.

18. The apparatus according to claim 12 further comprising:
means journalling said cantilever means for rotational movement about said transverse axis;
and said first means movably supported by said second means for swivable movement of said first means about an axis substantially normal to said transverse axis whereby both the camber and yaw of the tire may be varied.

19. In an apparatus for testing tires, in combination:
tire mounting means adapted to support a tire for rotation about its own axis;
first means associated with said tire mounting means for oscillating a tire mounted thereon about a substantially diametral axis of the tire;
and second means associated with said tire mounting means for swivelling the tire, in any position of oscillation thereof, about an axis which is substantially tangent to the outer periphery of the tire and located substantially in the central plane thereof.

20. In an apparatus for testing tires, in combination:
tire mounting means adapted to support a tire for rotation about its own axis;
support means supporting said tire mounting means for oscillation about a second axis said axes having their closest portions located within the confines of the generally cylindrical space defined by the carcass of the tire positioned on said mounting means and said axes together defining a plane in space;
and means interconnecting said tire mounting means and said support means for angularly shifting, in said plane, said first mentioned axis with respect to said second axis.

References Cited

UNITED STATES PATENTS

| | | | |
|---|---|---|---|
| 2,664,297 | 12/1953 | Booth | 280—96.2 |
| 3,060,734 | 10/1962 | Obarski et al. | 73—146 |
| 3,147,025 | 9/1964 | Good | 280—96.2 |

DONALD O. WOODIEL, Primary Examiner